(12) United States Patent
Rajaram et al.

(10) Patent No.: US 7,316,011 B1
(45) Date of Patent: Jan. 1, 2008

(54) MEMORY REDUCTION FOR OBJECT-ORIENTED COMPILERS

(75) Inventors: Sadagopan Rajaram, Secunderabad (IN); Devidas Joshi, Hyderabad (IN); P. Vasantha Rao, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 501 days.

(21) Appl. No.: 10/268,488

(22) Filed: Oct. 10, 2002

(51) Int. Cl.
*G06F 9/45* (2006.01)

(52) U.S. Cl. .................. 717/157; 717/144; 717/146

(58) Field of Classification Search ........ 717/168–178, 717/140–143; 707/103
See application file for complete search history.

(56) References Cited

U.S. PATENT DOCUMENTS

| | | | | |
|---|---|---|---|---|
| 5,590,329 A | * | 12/1996 | Goodnow et al. | 717/144 |
| 5,625,773 A | * | 4/1997 | Bespalko et al. | 345/467 |
| 5,680,622 A | * | 10/1997 | Even | 717/154 |
| 5,764,994 A | * | 6/1998 | Craft | 717/159 |
| 5,963,742 A | * | 10/1999 | Williams | 717/143 |
| 6,061,513 A | * | 5/2000 | Scandura | 717/142 |
| 6,243,864 B1 | * | 6/2001 | Odani et al. | 717/154 |
| 6,305,011 B1 | * | 10/2001 | Safonov | 717/114 |
| 6,473,896 B1 | * | 10/2002 | Hicken et al. | 717/132 |
| 6,804,682 B1 | * | 10/2004 | Kemper et al. | 707/103 R |
| 6,807,548 B1 | * | 10/2004 | Kemper | 707/103 R |
| 2003/0106040 A1 | * | 6/2003 | Rubin et al. | 717/106 |
| 2004/0015515 A1 | * | 1/2004 | Beisiegel et al. | 707/103 Y |
| 2004/0186817 A1 | * | 9/2004 | Thames et al. | 707/1 |
| 2004/0205737 A1 | * | 10/2004 | Margaliot et al. | 717/143 |

* cited by examiner

*Primary Examiner*—Tuan Dam
*Assistant Examiner*—Isaac T Tecklu
(74) *Attorney, Agent, or Firm*—Lee & Hayes, PLLC

(57) ABSTRACT

An exemplary method includes parsing metadata associated with at least a portion of source code to construct a truncated parse tree; selecting a segment of the truncated parse tree; parsing metadata associated with the selected segment to construct one or more additional parse tree branches; and analyzing the truncated parse tree and the one or more additional parse tree branches. Such an exemplary method optionally includes generating code based, at least in part, on the analyzing and/or optionally includes purging or overwriting memory associated with the one or more additional parse tree branches. Other exemplary methods, devices and/or systems are also disclosed.

19 Claims, 8 Drawing Sheets

MEMORY REDUCTION FOR OBJECT-ORIENTED COMPILERS

TECHNICAL FIELD

The subject matter disclosed herein relates generally to methods, devices and/or systems for compiling source code, in particular, object-oriented source code.

BACKGROUND

During source code compilation, compilers typically construct a parse tree and carry the parse tree forward through various stages of the compilation process. In general, a parse tree includes a branch for every program element or component of the source code. Thus, a compiler typically demands or requires memory sufficient to store such a parse tree. Further, as the number of program elements or components in the source code increases, so does the memory demand or requirement for the parse tree. Consequently, a need exists for methods, devices and/or systems that help to reduce memory demand or requirements associated with parse tree storage. A need also exists for methods, devices and/or systems wherein memory demand or requirements scale more efficiently with respect to the number of program elements or components in a source code. Exemplary methods, devices and/or systems that address these needs and/or other needs are disclosed herein.

SUMMARY

An exemplary method includes parsing metadata associated with a source code to construct a truncated parse tree; selecting a segment of the truncated parse tree; parsing metadata associated with the selected segment to construct one or more additional parse tree branches; and analyzing the truncated parse tree and the one or more additional parse tree branches. Such an exemplary method optionally includes generating code based, at least in part, on the analyzing and/or optionally includes purging or overwriting memory associated with the one or more additional parse tree branches. Other exemplary methods, devices and/or systems are also disclosed.

Additional features and advantages will be made apparent from the following detailed description of illustrative embodiments, which proceeds with reference to the accompanying figures.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Figure 1:
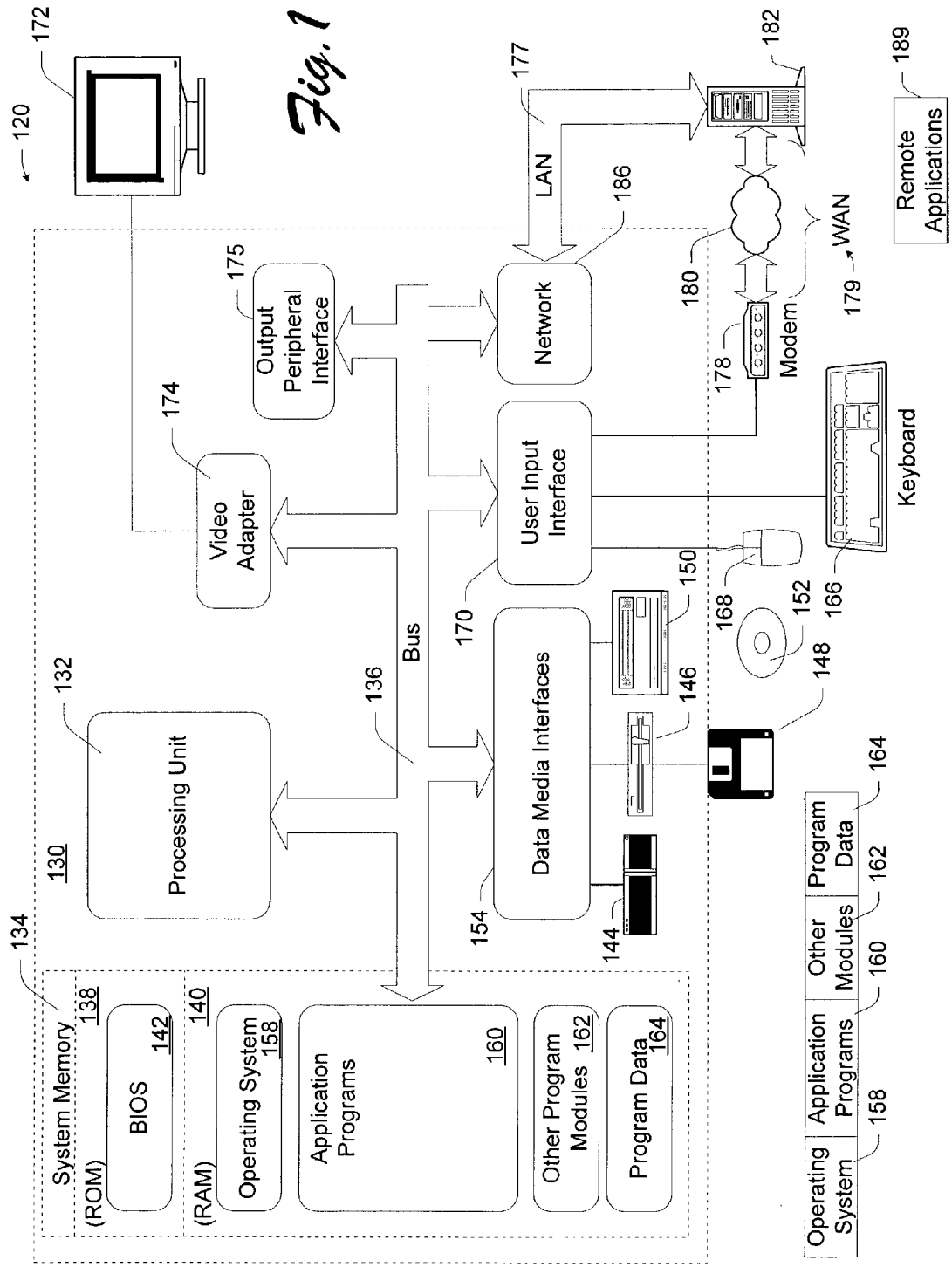
FIG. 1 is a block diagram generally illustrating an exemplary computer system on which various exemplary technologies disclosed herein may be implemented.

Turning to the drawings, wherein like reference numerals refer to like elements, various methods and converters are illustrated as being implemented in a suitable computing environment. Although not required, the methods and converters will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the methods and converters may be practiced with other computer system configurations, including hand-held devices, multi-processor systems, microprocessor based or programmable consumer electronics, network PCs, minicomputers, mainframe computers, and the like. The methods and converters may also be practiced in distributed computing environments where tasks are performed by remote processing devices that are linked through a communications network. In a distributed computing environment, program modules may be located in both local and remote memory storage devices.

Exemplary Computing Environment

FIG. 1 illustrates an example of a suitable computing environment 120 on which the subsequently described methods and converter arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
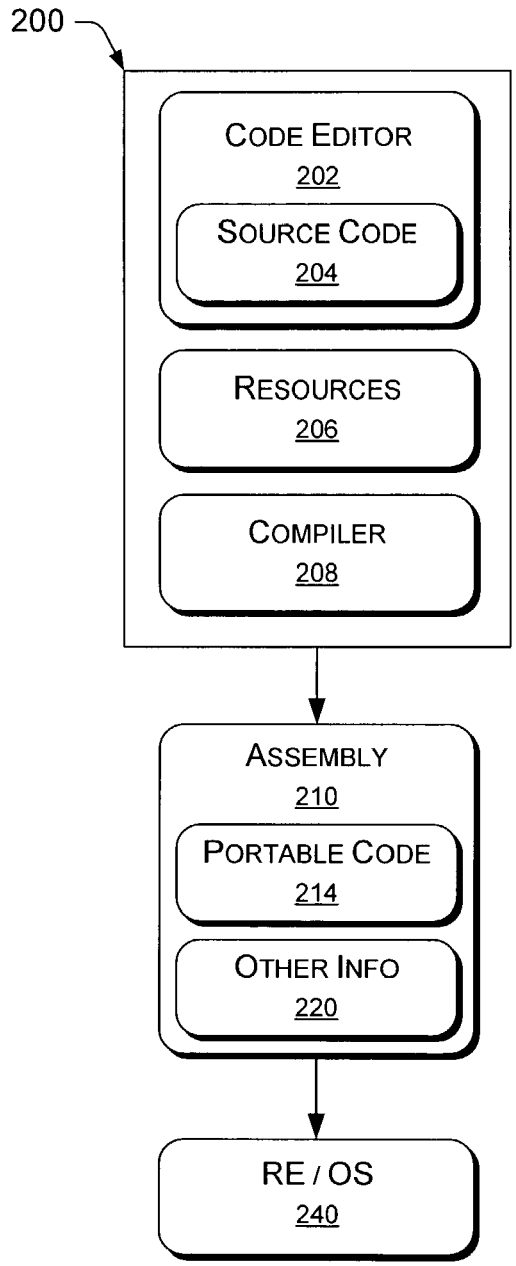
FIG. 2 is a block diagram illustrating an exemplary integrated development environment, an assembly and a runtime engine and/or OS.

FIG. 2 shows an exemplary integrated development environment (IDE) 200 and an assembly 210 targeted for execution on a runtime engine (RE) or an operating system (OS) 240. In object-oriented programming, the terms "Virtual Machine" (VM) and "Runtime Engine" (RE) have recently become associated with software that executes code on a processor or a hardware platform. In the description presented herein, the term "RE" includes VM. A RE is often associated with a larger system (e.g., IDE, framework, etc.) that allows a programmer to develop an application for a variety of users.

For a programmer, the application development process usually involves selecting an IDE, coding in an object-oriented programming language (OOPL) associated with that IDE to produce a source code, and compiling the source code using a compiler associated with the IDE. In FIG. 2, the IDE 200 includes a code editor 202 for writing or editing source code 204, resources 206 (e.g., libraries, utilities, etc.) and a compiler 208 for compiling the source code 204. The programmer may elect to save source code and/or resources in a project file and/or a solution file, which may contain more than one project file. If a programmer elects to compile the source code and/or associated resources, then the resulting compiled code, and other information if required, is then typically made available to users, e.g., as an assembly, an executable file, etc.

FIG. 2 shows an assembly 210 generated by the IDE 200, which includes portable code 214 and optionally other information 220 (e.g., metadata, etc.) that may be necessary for proper execution of the portable code 214. An assembly is typically available as one or more files capable of distribution over a network. For example, the .NET™ IDE can produce an assembly as a portable executable file containing intermediate language code (IL code) and metadata, which is suitable for distribution over the Internet and execution using the .NET™ RE. Of course, one or more separate code files and one or more separate data files may be contained within a portable executable file or an assembly. Upon receipt of the requisite file or files, a user can execute an embedded application or applications on a RE or an OS associated with the selected IDE. FIG. 2 shows the RE or OS 240 associated with the IDE 200.

Traditional IDEs or frameworks, such as the JAVA™ language framework (Sun Microsystems, Inc., Palo Alto, Calif.), were developed initially for use with a single OOPL (i.e., monolithic at the programming language level); however, a recently developed framework, .NET™ framework (Microsoft Corporation, Redmond, Wash.), allows programmers to code in a variety of OOPLs (e.g., VB, C++, C#, JScript, etc.). This multi-OOPL or multi-source code framework is centered on a single compiled intermediate language.

Figure 3:
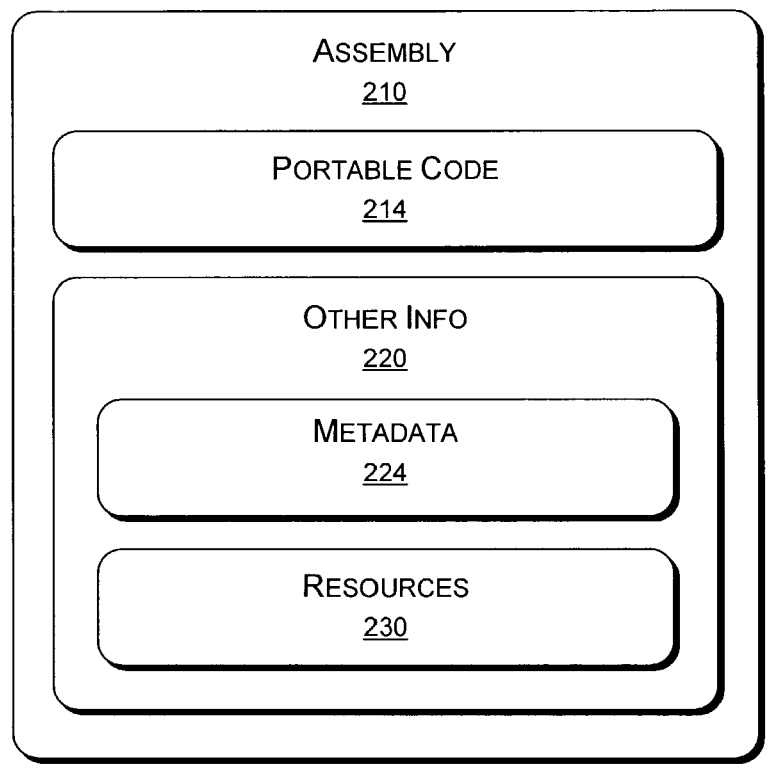
FIG. 3 is a block diagram illustrating an exemplary assembly containing portable code and metadata.

FIG. 3 shows the exemplary assembly 210 and further details pertaining to the other information 220, for example, metadata 224 and resources 230. In general, metadata 224 is "data about data", for example, declarative information regarding an assembly or contents thereof. The metadata 224 may allow the assembly 210 to be "self-describing". In the IDE 200 of FIG. 2, the compiler 208 emits declarative information or metadata for containment in the assembly 210. The metadata 224 may include a description of the assembly 210, identity (e.g., name, version, culture, public key, etc.), exported types, other assemblies upon which the assembly 210 depends, security permissions, description of types, name, visibility, base class, and interfaces implemented, members (e.g., methods, fields, properties, events, nested types, etc.), and/or attributes.

The assembly 210 contains the metadata 224, for example, organized in a series of tables and heap structures, wherein one table may describe classes in a code (e.g., a class table) while another table may describe fields (e.g., a field table). Further, if a code has ten classes, then the class table will typically have tens rows, one for each class. Metadata tables may also reference other tables and heaps. For example, a metadata table for classes may reference a metadata table for methods, properties and/or events. Yet further, each row of each metadata table is optionally uniquely identified in corresponding code by a metadata token. Metadata tokens are conceptually similar to pointers that reference a particular metadata table. For example, a metadata token may be a four-byte number wherein the top byte denotes a metadata table to which a particular token refers (method, type, etc.) and the remaining three bytes specify a row in the metadata table that corresponds to a programming element being described.

Metadata heap structures may include string, blob, user string, GUID, etc., wherein, for example, strings used to name types and members are stored in the string heap. Cross-references between tables and heaps can also allow a method table to point to a method's name as stored in a string heap; thus, alleviating the need to store the method's name in the method table.

In general, type metadata contains information about what type a descendant type extends from. In addition, a base type may be defined in the same assembly or a different assembly. Method metadata typically contains a set of zero or more parameters, wherein each parameter has an associated type.

An example of metadata or declarative information is given below with reference to the following exemplary code:

```
public class MyClass extends BaseClass {
public int call1(int i) {
int local1;
local = 10;
int local2;
local2 = call2(local);
return local2;
}
public int call2(int j) {
int local3;
local3 = 10;
int local4;
local4 =call3(local3);
return local4;
}
public int call3(int k) {
int local5;
local5 = 10;
int local6;
local6 =call4(local5);
return k;
}
public int call4(int 1) {
int local7;
local7 = 10;
int local8;
local8 = call1(local7);
return local8;
}
}
```

Metadata or declarative information corresponding to this exemplary code may include:
 Class name—MyClass
 Super class—BaseClass
 Methods—Call1, Call2, Call3, Call4
 Method Information
  1. Call1
   Return Type—int
   Parameters—int
  2. Call2
   Return Type—int
   Parameters—int
  3. Call3
   Return Type—int
   Parameters—int
  4. Call4
   Return Type—int
   Parameters—int As mentioned above, the compiler 208 emits such declarative information or metadata for containment within the assembly 210, for example, in organized table, heap or other structures.

Figure 4:
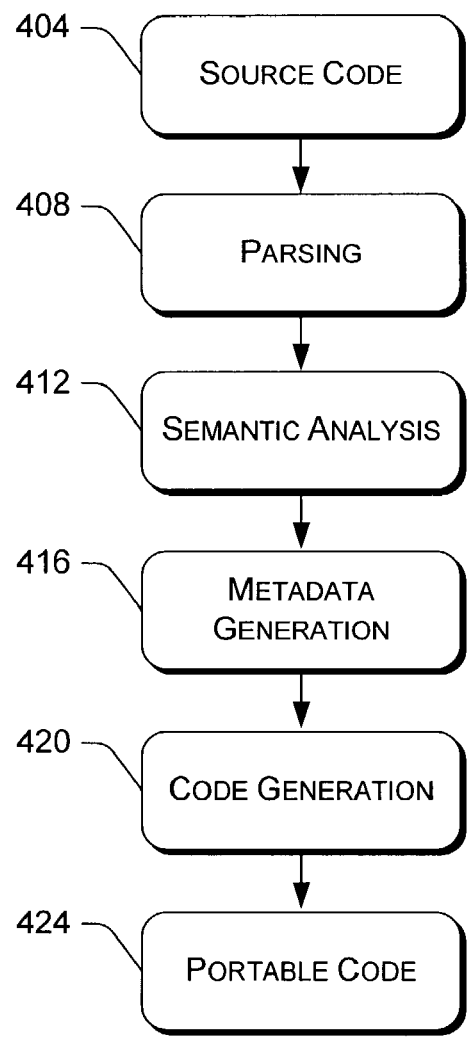
FIG. 4 is a block diagram of a typical prior art compilation method.

FIG. 4 shows a typical compilation method 400 that uses metadata. The typical compilation method 400 includes several functional stages for compilation of a source code to a portable code (e.g., intermediate language code, etc.), which may be included in a portable executable file, an assembly, etc. In a source code input block 404, a typical compiler receives source code. Next, in a parsing block 408, the typical compiler parses the source code. Parsing or syntactic analysis involves arranging program elements or components contained in the source code in a logical manner, typically to construct an arrangement known as a parse tree. As mentioned in the background section, a typical compiler constructs a parse tree that has a branch for each program element or component in the source code. A semantic analysis block 412 follows wherein the constructed parse tree is carried forward and checked for semantic correctness, typically from parse tree branch to parse tree branch, to ensure compliance with language rules. For example, to ensure that strings are not added to integers, etc. After the semantic analysis block 412, the constructed parse tree is carried forward to a metadata generation block 416 to generate metadata suitable for inclusion in a portable executable file, an assembly, etc. The tree is also carried to a code generation block 420, wherein the typical compiler transverses the constructed parse tree according to a strict set of rules to generate portable code. In general, the code generation block 420 generates code for the entire source code (e.g., for all program elements or components) and relies on a complete parse tree (e.g., wherein all program elements or components are represented in detail). Finally, in an emission block 424, the typical compiler emits the portable code, which includes the generated code. The portable code and the generated metadata are optionally emitted as a portable executable file, an assembly, etc.

Note that the compilation method 400 constructs a parse tree having branches for each program element or component during the parsing block 408 and carries this parse tree forward, stage-by-stage, to the code generation block 420. Thus, the compilation method 400 requires a compiler that can access memory sufficient to store the parse tree from its initial construction to code generation. As described below, exemplary methods, compilers and/or components thereof aim to diminish memory demands during compilation. In particular, various exemplary methods, compilers and/or components thereof, carry forward only select information, which, in turn, reduces memory demand during compilation.

Figure 5:
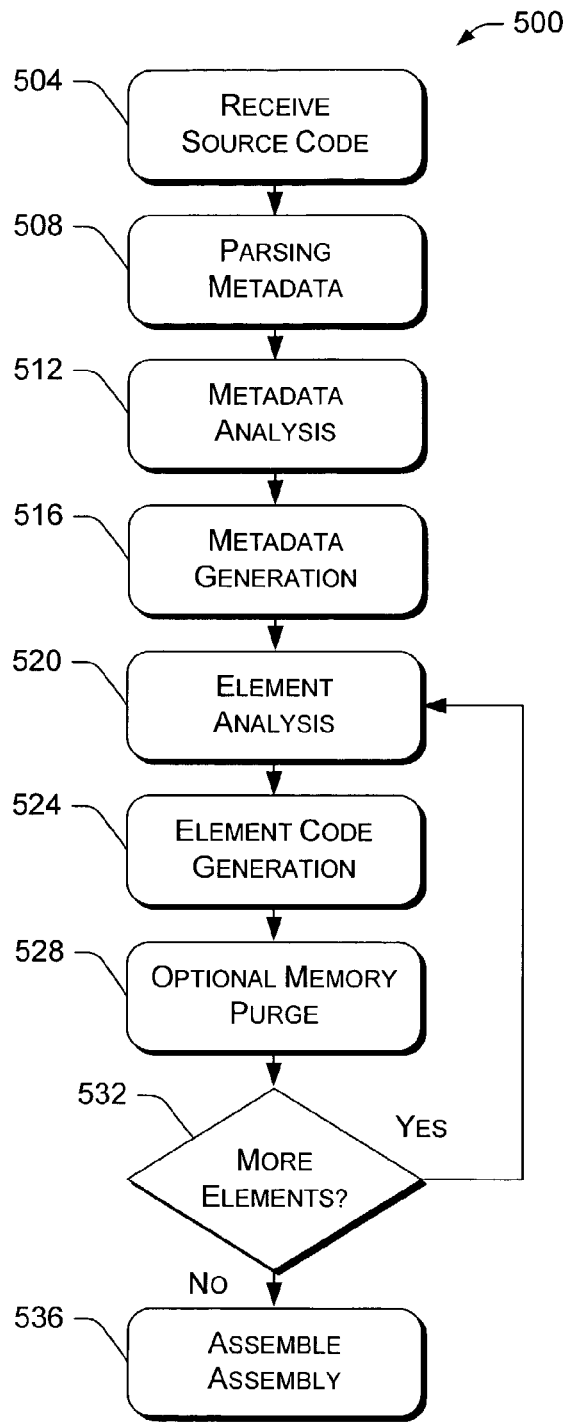
FIG. 5 is a block diagram of an exemplary compilation method for reducing memory demand or requirements.

FIG. 5 shows an exemplary compilation method 500 for reducing memory demand during compilation. In a source code input block 504, a compiler receives at least a portion of source code. Next, in a parsing block 508, the compiler parses the received source code for metadata. For example, the compiler parses the received source code for metadata associated with publicly visible classes (which may be used from other portions of the source code). In general, the source code is composed of one or more program elements or components (e.g., methods, classes, etc.). As such, the parsing block 508 may skip portions relating to a method body and/or store such information to parse the method body at a later time. Thus, as described in more detail below, the parsing block 508 does not construct a complete parse tree. Or in other words, the parsing block 508 may construct a parse tree that does not have a branch for each program element or component. In essence, the parsing block 508 may elect to construct a truncated parse tree, for example, truncated at the level of method bodies (e.g., including a branch for each method body but not including branches for information specific to each method body). As described herein, a truncated parse tree is constructed to any level or levels suitable to achieve a reduction in memory demand or requirements.

A metadata analysis block 512 follows wherein the compiler selects metadata associated with at least one source code program element or component (e.g., from one element or component to all program elements or components associated with the source code) and analyzes the selected metadata for semantic correctness, for example, to ensure that an associated method does not have a void parameter type, etc. Following from the example given above wherein the parsing block 508 constructs a parse tree truncated at the level of method bodies, the metadata analysis block 512 may involve selecting a particular method definition and analyzing it for semantic correctness. In addition, the metadata analysis block 512 may cross-reference metadata from different components.

A metadata generation block 516 follows wherein the method 500 generates metadata, for example, in a form suitable for inclusion in a portable executable file, an assembly, etc. According to the exemplary method 500, the metadata generation block 516 generates metadata for selected code, wherein the selected code may include one program element or component or an entire source code. Where the metadata generation block 516 generates metadata for an entire source code, typically no further metadata generation is required.

An element or component analysis block 520 follows metadata generation. According to the exemplary method 500, the analysis block 520 completes construction for one or more branches of the truncated parse tree (e.g., typically by adding one or more new branches, extension branches, etc.). For example, in the case of truncation at the level of method bodies, the analysis block 520 may complete construction of the truncated parse tree by adding one or more branches that correspond to a single method body (e.g., a program element or component). The analysis block 520 may after construction analyze the one or more completed branches for semantic correctness, for example, to ensure that a method call does not call a non-existent method.

Once the analysis block 520 has analyzed the one or more completed branches of the truncated parse tree, then a code generation block 524 generates code corresponding to and/or associated with the branches (e.g., typically corresponding to and/or associated with one or more program elements or components, etc.). According to the exemplary method 500, after (and possibly at some time during) code generation, parse information for generated code is no longer useful and/or no longer required (e.g., parse information related to method body and/or method body specifics) and thus a purge block 528 optionally purges unnecessary information associated with the generated code and/or the metadata to thereby free memory. Of course, if additional program elements or components require analysis, the unnecessary information may simply be marked to allow for overwriting. The unnecessary information may include structures (except final output structures) associated with one or more selected programming elements or components. For example, a method call expression cannot use a variable that is of a different type from the one the method is defined with. Thus, any non-final structure related to the method call may be purged or otherwise discarded.

To complete the compilation, the method 500 continues in a decision block 532 which decides whether additional program elements or components must be analyzed. If the decision block 532 decides that additional program elements or components must be analyzed, the method 500 returns to the analysis block 520 wherein selection of additional programming elements or components occurs (e.g. another method body, etc.). Again, memory used in the analysis of a prior component is optionally purged or available for overwriting to reduce memory demand or requirements. If the decision block 532 decides that no additional program elements or components must be analyzed, then the method 500 continues in an assembly block 536, which builds or assembles an assembly based on generated metadata and generated code. In general, portable code includes one or more generated codes which are suitable for inclusion in an assembly or portable executable file. Thus, according to the exemplary method 500, a segmental and selective analysis of metadata and code generation helps to reduce memory demand and/or requirements. In general, the largest memory demand coincides with the most memory intensive selected metadata (e.g., which may be the most extensive method body, etc.).

In an alternative exemplary method, a complete parsing of source code occurs prior to metadata analysis (e.g., prior to the metadata analysis block 512 of the method 500). According to this alternative, the parse tree is carried forward throughout the compilation and there is no associated memory reduction for the parse tree. However, the analysis and code generation happens for each programming element or component (a source file, for example) separately and the memory used during analysis and code generation of this programming element or component can be purged and/or reused for analyzing and generating code for another element. As described here, this alternative exemplary method implements only parts of the exemplary method 500. While the alternative exemplary method typically results in a lesser reduction in memory than method 500, the reduction is significant enough to be considered for its ease of implementation.

Exemplary Implementation

The following exemplary implementation illustrates memory reduction using various aspects of the exemplary method 500. For purposes of illustration, consider a simple grammar that defines a simple language. While the simple grammar and simple language may lack aspects found in commercially available grammars and languages and/or be incomplete, they suffice to illustrate memory reduction.

According to the simple grammar, symbols "*" and "+" correspond to zero or more occurrences and one or more occurrences, respectively. Further, terminal are given in an italic font; non-terminal are in square brackets; an identifier (e.g., "[ident]") stands for a sequence of alphabets that denotes the name of a class, a variable or a class member; and a literal (e.g., "[literal]") may be a number (e.g., 10) or a string (e.g., "hello").

[Compilation Unit] → [Type Declaration]*
[Type Declaration] → class [ident] (| extends) [ident] { [Method Declaration]*|}
[Method Declaration] → public [type] [ident] ([type] [ident]) { [Statement]*}
[Statement] → ([Variable Declaration] | [Expression] | [return]);
[type] → int | void | [ident]
[Expression] → [Assignment] | [Method Call]
[Assignment] → [ident] = [literal] | [ident] | [Method Call]
[Method Call] → [ident] ([ident] (, [ident])*)
[return] → return (| [ident] | [literal])

Figure 6:
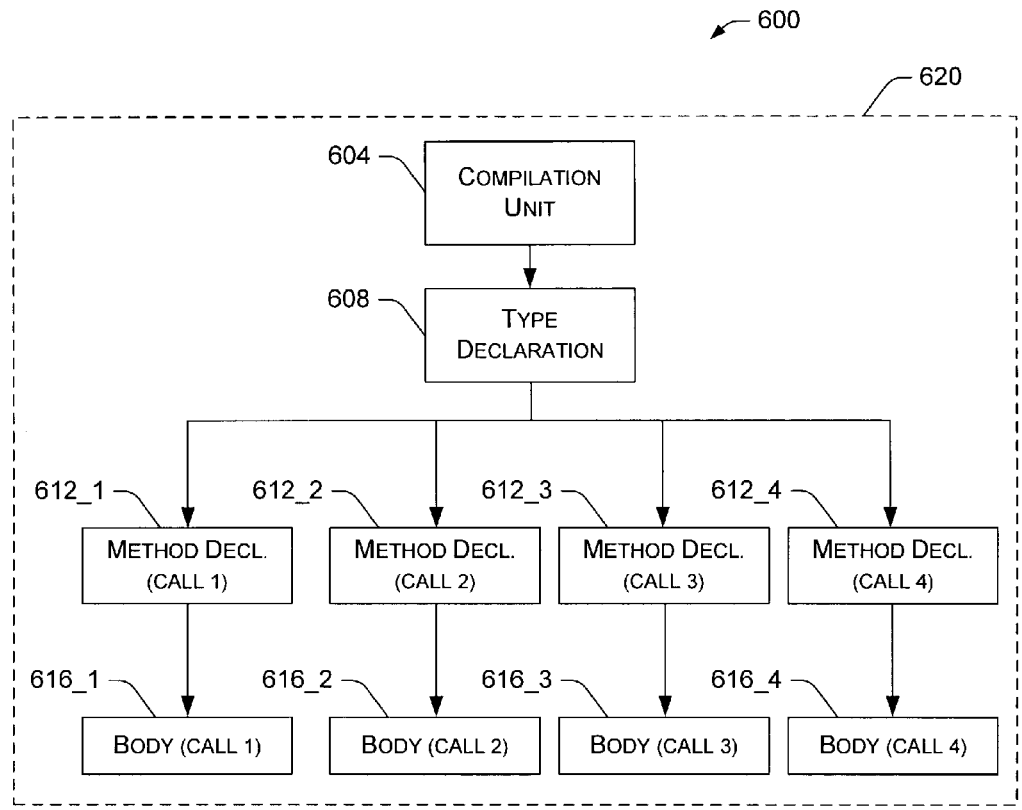
FIG. 6 is a block diagram of an exemplary parse tree.

With reference to the aforementioned exemplary code, FIG. 6 shows a truncated parse tree 600 according to the simple grammar. Parsing metadata yields a compilation unit 604 (e.g., one or more related components) and a type declaration 608 with four method declaration branches 612_1, 612_2, 612_3, and 612_4, which correspond to the method calls of the exemplary code (e.g., call 1, call 2, call 3 and call 4). Further, each of the method declarations 612_1, 612_2, 612_3, and 612_4, has a corresponding method body 616_1, 616_2, 616_3, and 616_4. A dashed box 620, surrounding the truncated parse tree 600 represents memory associated with the truncated parse tree 600.

Figure 7:
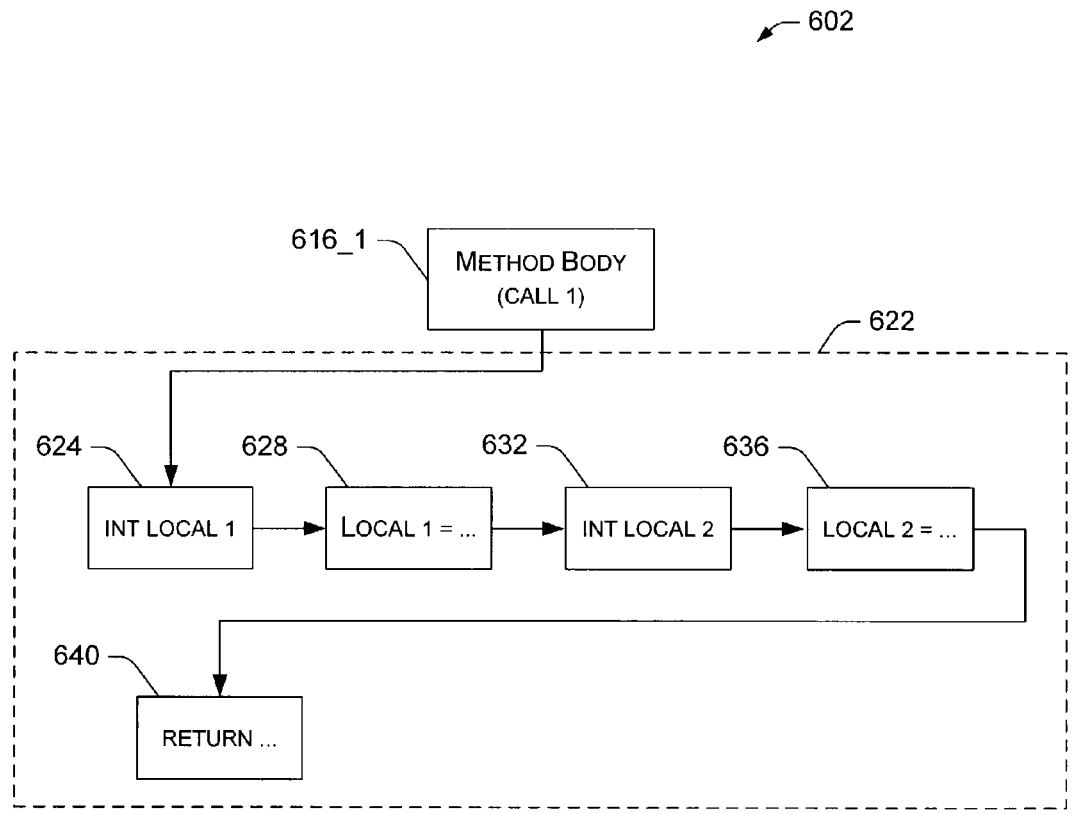
FIG. 7 is a block diagram of an exemplary branch of a parse tree.

FIG. 7 shows an exemplary constructed parse tree method body branch 602, which is a continuation of the truncated parse tree 600, that stems from the method body 616_1, which is associated with "call 1". As such, parsing reveals declaration of "int local 1" 624, "local 1= . . . " 628, "int local 2" 632, "local 2= . . . " 636, and "return" 640. A dashed box 622, surrounding the constructed parse tree method body branch 602, represents the memory demand or requirement for this particular branch 602. Note that each of the other method bodies 616_2, 616_3, and 616_4 have parse trees similar to that of the method body 616_1 (e.g., substituting local 3 and 4, local 5 and 6, and local 7 and 8 for local 1 and 2, respectively).

In this exemplary implementation, assume that each element in the parse tree demands or requires an equal amount of memory, denoted x bytes. With this assumption, the initial memory demand or requirement (e.g., the dashed box 620) for parsing metadata for the four methods of the exemplary source code is 10x, wherein each method requires x memory to store the metadata and x memory to store information about the method body. Overall, the initial demand or requirement is 10x memory because there are four methods (e.g., 4*2x memory) and one type (e.g., x memory) in a single compilation unit (e.g., x memory).

Regarding method bodies, each body 616_1, 616_2, 616_3, and 616_4 demands or requires 5x memory (e.g., the dashed box 622) because there are five statements per body. As already mentioned, a typical compiler or a typical compilation method, would generally construct a complete parse tree, which would demand or require 10x memory plus 5x memory per method body, for a total of 30x memory.

According to the exemplary implementation, the largest memory demand or requirement for a workable parse tree (e.g., the truncated parse tree 600 plus the selected parse tree 602) is less because of program element or component segmentation and/or selection. For example, initial parsing demands or requires 10x memory (e.g., the dashed box 620) while method body parsing demands or requires 5x memory (e.g., the dashed box 622), for a total of 15x memory. After analysis and code generation for one method (e.g., a program element or component), the corresponding memory demand or requirement (e.g., 5x memory) is either purged or marked for overwriting.

This particular exemplary implementation results in a reduction in memory demand or requirement of 50%. In other implementations, memory reduction may be much more due to, for example, the method body being much larger than the metadata information and/or the number of methods being large. Further, various exemplary method disclosed herein scale differently than typical methods used in compilation.

Figure 8:
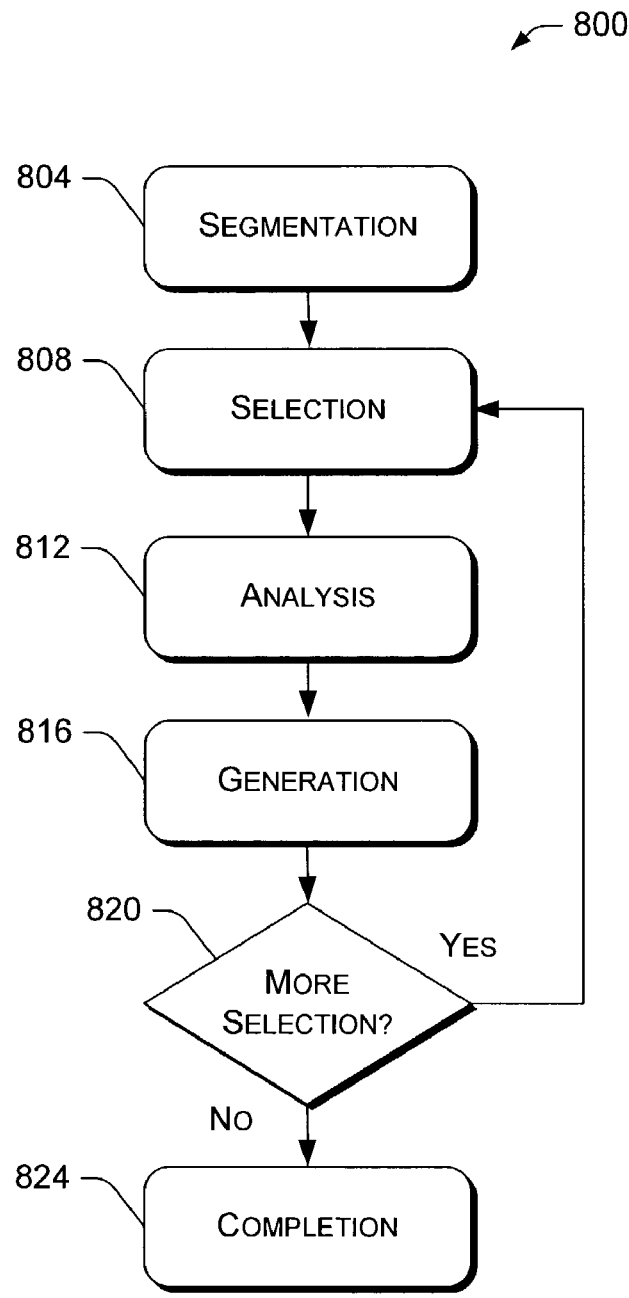
FIG. 8 is a block diagram of an exemplary method for segmenting, selecting and generating.

FIG. 8 shows an exemplary method 800 for segmentation, selection and generation. In a segmentation block 804, data (e.g., metadata) pertaining to at least a portion of source code is parsed or segmented to a certain level or levels (e.g., to construct a truncated parse tree). Next, in a selection block 808, a selection is made of data from the segmented data and this selected data or segment of data is further parsed or segmented, for example, to construct one or more additional parse tree branches (new branches, extension branches, etc.) by parsing to one or more other levels. In an analysis block 812, the parsed or segmented data (e.g., truncated parse tree or relevant portion thereof) and further parsed or segmented data (e.g., the one or more additional parse tree branches) are analyzed, for example, for semantic correctness. A generation block 816 follows wherein code corresponding to the analyzed data is generated. After the generation block 816, the analyzed data is optionally purged from memory or marked for overwriting. A decision block 820 follows wherein a decision is made as whether further data selection per the selection block 808 is required. If further data selection is required, then the method 800 continues in the selection block 808. If not, then the method continues in the completion block 824. The completion block 824 optionally assembles the code generated by the generation block 812, associated data (e.g., metadata) and/or resources. Overall, the exemplary method 800 may reduce memory demand or requirements of a compilation process or a compiler and/or scale more efficiently with respect to source code than typical compilation processes or typical compilers.

Thus, although some exemplary methods and systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A method for reducing memory demand during compilation of source code comprising:
   receiving source code;
   parsing metadata associated with at least a portion of the source code to construct a truncated parse tree, truncated to achieve a reduction in memory demand or requirements for compilation of the source code;
   selecting a segment of the truncated parse tree;
   parsing metadata associated with the selected segment to construct one or more additional parse tree branches;
   analyzing the truncated parse tree and the one or more additional parse tree branches;
   generating code based, at least in part, on the analyzing; and
   purging from memory the one or more additional parse tree branches after the generating.

2. The method of claim 1, further comprising repeating the selecting after the generating.

3. The method of claim 1, further comprising repeating the selecting after the purging.

4. The method of claim 1, wherein the metadata comprises declarative information related to the source code.

5. The method of claim 1, wherein the metadata comprises at least one member selected from a group consisting of class information and type information.

6. The method of claim 1, wherein the source code is written in an object-oriented programming language.

7. The method of claim 1, wherein the source code is associated with a framework that relies on a monolithic programming language.

8. The method of claim 1, wherein the source code is associated with a framework that accepts a plurality of programming languages.

9. The method of claim 1, wherein the generating generates a code in an intermediate language.

10. A computer-readable medium storing computer-executable instructions for use in reducing memory demand during compilation of source code, the instructions to receive source code, to parse metadata associated with at least a portion of the source code to construct a truncated parse tree, truncated to achieve a reduction in memory demand or requirements for compilation of the source code; to select a segment of the truncated parse tree; to parse metadata associated with the selected segment to construct one or more additional parse tree branches; to analyze the truncated parse tree and the one or more additional parse tree branches; to generate code based, at least in part, on the analyzing; and to to purge from memory the one or more additional parse tree branches.

11. A system for reducing memory demand during compilation of source code, the system comprising:
   a processor; and
   memory for storing processor-executable instructions to configure the system to receive source code, to parse metadata associated with at least a portion of the source code to construct a truncated parse tree, truncated to achieve a reduction in memory demand or requirements for compilation of the source code; to select a segment of the truncated parse tree; to parse metadata associated with the selected segment to construct one or more additional parse tree branches; to analyze the truncated parse tree and the one or more additional parse tree branches; to generate code based, at least in part, on the analyzing; and to purge from memory the one or more additional parse tree branches after generating code for the one or more additional parse tree branches.

12. The system of claim 11, wherein the metadata comprises declarative information related to the source code.

13. The compiler of claim 11, wherein the metadata comprises at least one member selected from a group consisting of class information and type information.

14. The system of claim 11, wherein the source code is written in an object-oriented programming language.

15. The system of claim 11, wherein the source code is associated with a framework that relies on a monolithic programming language.

16. The system of claim 11, wherein the source code is associated with a framework that accepts a plurality of programming languages.

17. The system of claim 11, configured to generate a code in an intermediate language.

18. A system for reducing memory demand during compilation of source code, the system comprising:
   processor means for executing instructions;
   memory means for storing executable instructions;
   means for receiving source code;
   means for parsing metadata associated with at least a portion of the source code to construct a truncated parse tree, truncated to achieve a reduction in memory demand or requirements for compilation of the source code;
   means for selecting a segment of the truncated parse tree;
   means for parsing metadata associated with the selected segment to construct one or more additional parse tree branches;
   means for analyzing the truncated parse tree and the one or more additional parse tree branches;
   means for generating code based, at least in part, on the analyzing, and
   means for overwriting memory associated with the one or more additional parse tree branches during construction of one or more yet additional parse tree branches for a selected segment of the truncated parse tree.

19. A method for reducing memory demand during compilation of source code comprising:
   receiving source code;
   parsing metadata associated with at least a portion of the source code to construct a truncated parse tree, truncated to achieve a reduction in memory demand or requirements for compilation of the source code;
   selecting a segment of the truncated parse tree;
   parsing metadata associated with the selected segment to construct one or more additional parse tree branches;
   analyzing the truncated parse tree and the one or more additional parse tree branches for, at least, semantic correctness;
   generating code based, at least in part, on the analyzing;
   determining whether to select an additional segment of the truncated parse tree; and
   if an additional segment of the truncated parse tree is selected, parsing metadata associated with the additional selected segment to construct one or more additional parse tree branches wherein the parsing comprises overwriting memory associated with the previously constructed one or more additional parse tree branches.

* * * * *

UNITED STATES PATENT AND TRADEMARK OFFICE
CERTIFICATE OF CORRECTION

| | | |
|---|---|---|
| PATENT NO. | : 7,316,011 B1 | Page 1 of 1 |
| APPLICATION NO. | : 10/268488 | |
| DATED | : January 1, 2008 | |
| INVENTOR(S) | : Sadagopan Rajaram et al. | |

It is certified that error appears in the above-identified patent and that said Letters Patent is hereby corrected as shown below:

In column 11, line 52, in Claim 10, after "to" delete "to".

In column 12, line 7, in Claim 13, delete "compiler" and insert -- system --, therefor.

In column 12, line 37, in Claim 18, delete "analyzing," and insert -- analyzing; --, therefor.

Signed and Sealed this

Fifteenth Day of February, 2011

David J. Kappos
*Director of the United States Patent and Trademark Office*